United States Patent [19]

Belin et al.

[11] Patent Number: 4,891,052
[45] Date of Patent: Jan. 2, 1990

[54] IMPINGEMENT TYPE SOLIDS COLLECTOR DISCHARGE RESTRICTOR

[75] Inventors: Felix Belin, Brecksville; David J. Walker, Wadsworth, both of Ohio

[73] Assignee: The Babcock & Wilcox Company, New Orleans, La.

[21] Appl. No.: 312,165

[22] Filed: Feb. 21, 1989

[51] Int. Cl.$^4$ ............................................. B01D 45/00
[52] U.S. Cl. ..................................... 55/429; 55/432; 55/444
[58] Field of Search ................. 55/309, 429, 432, 430, 55/442–446

[56] References Cited

U.S. PATENT DOCUMENTS

| | | | |
|---|---|---|---|
| 2,221,073 | 11/1940 | Bubar | 55/444 X |
| 2,768,707 | 10/1956 | Campbell | 55/432 X |
| 3,421,666 | 1/1969 | Lawson | 55/432 X |
| 4,759,315 | 7/1988 | Chiou et al. | 55/444 X |

Primary Examiner—Charles Hart
Attorney, Agent, or Firm—Robert J. Edwards; Michael L. Hoelter

[57] ABSTRACT

This invention pertains to a discharge restrictor secured to the lower end region of impingement members installed in the flue gas path of a circulating fluidized bed boiler. The discharge restrictor incorporates a pivotable baffle plate that prevents the flue gas from bypassing the impingement members yet allows the particles that are collected to gather in an adjacent storage hopper. The baffle plate is normally biased to block access to the storage hopper until a sufficient mass of particles collect on the baffle plate thereby overcoming this bias. In doing so, the plate temporarily pivots to the open position enabling the particles to advance towards the storage hopper.

17 Claims, 3 Drawing Sheets

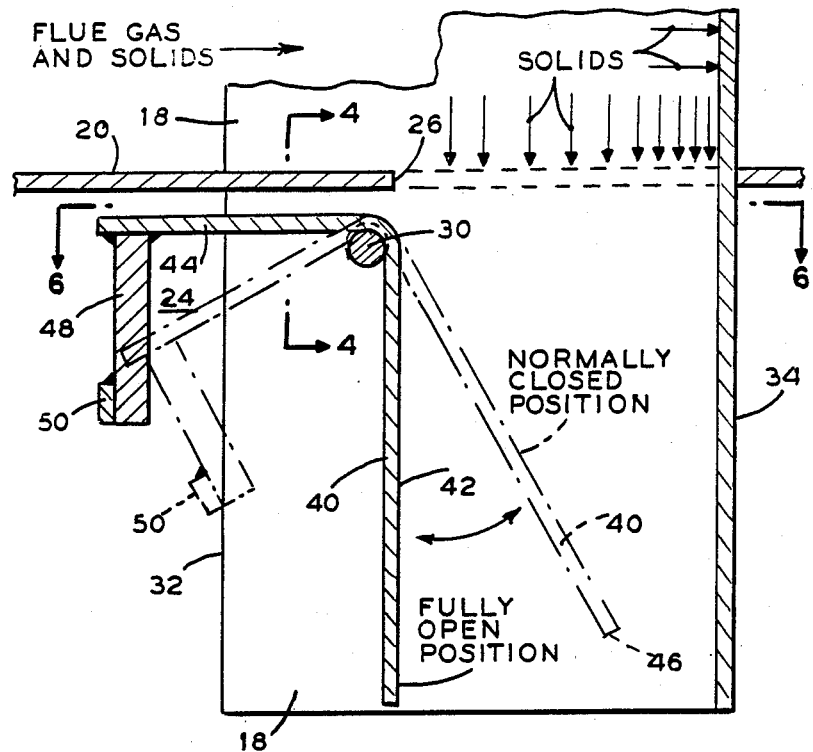
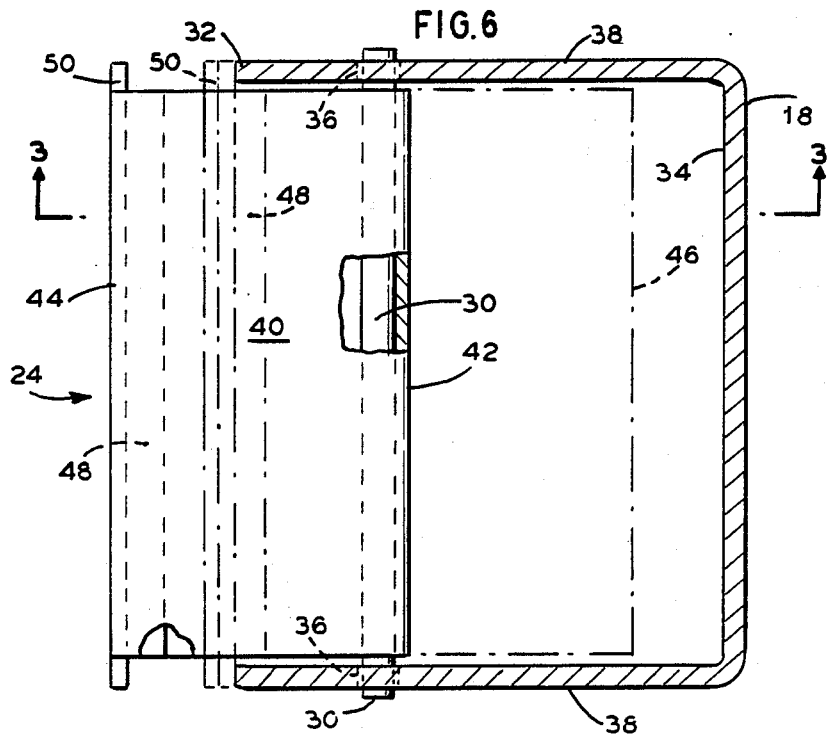

IMPINGEMENT TYPE SOLIDS COLLECTOR DISCHARGE RESTRICTOR

FIELD OF THE INVENTION

This invention pertains to the removal of solid particles from a solids-laden gas stream, for example from the flue gas of a circulating fluidized bed (CFB) boiler, and more particularly to a discharge restrictor whereby solid particles are admitted into a storage hopper while, at the same time, the flow of flue gas into and out of the hopper is restricted.

BACKGROUND OF THE INVENTION

Solid particles entrained in the flue gas of a circulating fluidized bed (CFB) boiler can be removed in a variety of ways. One method is to utilize an impingement-type collector that is positioned directly in the flow path of the flue gas. The theory being that as the solid particles strike the surface of the impingement members in the in-line collector, they will collect and fall into a hopper underneath the collector. A typical impingement-type collector utilizes an array of vertically suspended U-shaped members.

Because such in-line collectors increase flow resistance, care must be taken to prevent the flue gas from bypassing all or portions of the collector such as by flowing underneath it through the hopper. To prevent this, a bottom plate or pan is installed across the collector to channel the flue gas through it. This pan separates the collector from the hopper and prevents the flue gas from flowing into the hopper and across the top of the stored particles. If such flow or bypassing were permitted, some of the particles stored in this hopper would 'spill over' or again become undesirably entrained in the flue gas.

For solid particles to collect in the hopper from the collector, however, there must be openings in this pan for these particles to pass through. Without such openings, the collected solids would plug the flue gas path by accumulating and sintering on the tightly packed impingement members of the collector. With such openings, however, an undesirable avenue for the passage of the flue gas into the hopper is created.

In an effort to control this situation in such collectors, the openings in the pan are restricted in size to fit entirely within the enclosed area of the vertically suspended members. Unfortunately, because of the large number of suspended members in impingement type collectors, these numerous openings reduce the pan's ability to prevent the flue gas from bypassing underneath the collector.

To prevent such by-passing, a box or cone with a smaller opening for discharge into the hopper was secured around and underneath each opening in the pan. Although this appeared to be a satisfactory solution, after some period of operation these boxes or cones were found to be plugged or nearly plugged as a result of the sintering of the collected particles.

Consequently, it is an object of this invention to devise a system whereby solid particles collected in an impingement-type collector are transferred to a storage hopper. Another object of this invention is a system that prevents the flue gas flowing through an impingement-type collector from bypassing this collector. A further object is a system that inhibits flue gas from flowing, in either direction, through the openings required for proper solids transport. These and other features of this invention will become obvious upon further investigation.

SUMMARY OF THE INVENTION

A discharge restrictor for an impingement type in-line collector is disclosed having a rod pivotally secured to a lower end region of a vertically oriented impingement member. This rod would generally extend between a pair of spaced flanges that typically form a part of the impingement member. Secured to and bent partially around this rod is a baffle plate which is pivotable between open and closed positions. This baffle plate is positioned just underneath an opening in the bottom pan of the collector around which the impingement member extends.

A first portion of this baffle plate is sized to closely fit within the enclosed area of the impingement member and effectively obstruct or block off this opening. A second portion is configured to extend beyond these flanges and outside the enclosed area of the impingement member and its associated opening. This second portion supports a stop which is used to prevent any further rotation of the baffle plate beyond a preselected location. Bias means normally bias this baffle plate in the closed position which is when the first portion of the baffle plate blocks off all but a relatively small portion of the enclosed area of the impingement member and hence its opening. Pivoting means permit the baffle plate to pivot between its open and closed positions or its unblocking and blocking positions.

BRIEF DESCRIPTION OF THE DRAWINGS

FIG. 3 is a side pictorial view, partially cut-away, of the restrictor assembly.

FIG. 6 is a planar view of the restrictor assembly taken along lines 6—6 of FIG. 3.

DETAILED DESCRIPTION OF THE DRAWINGS

Figure 1:
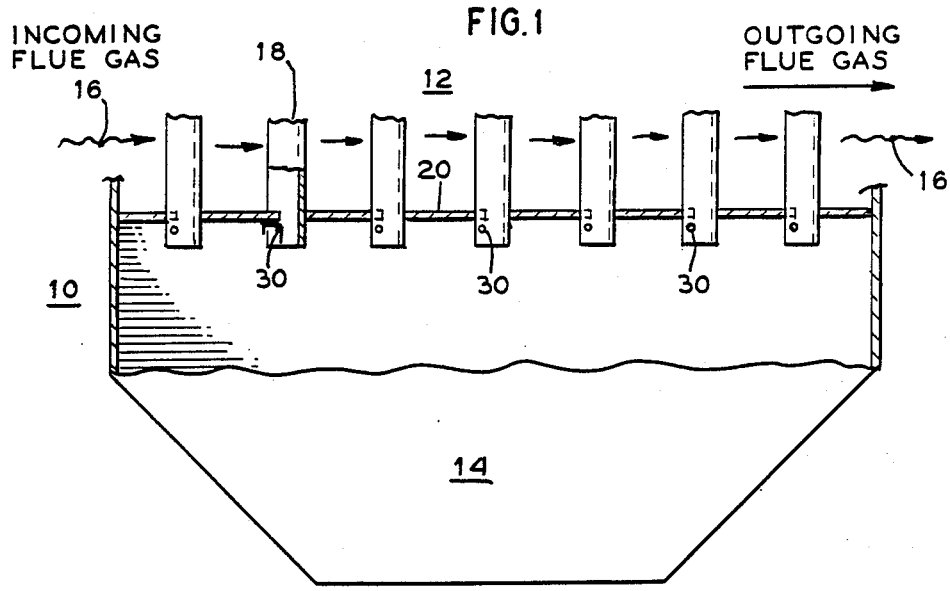
FIG. 1 is a side pictorial view of a portion of a boiler showing the orientation of an impingement-type collector and a storage hopper.
Figure 2:
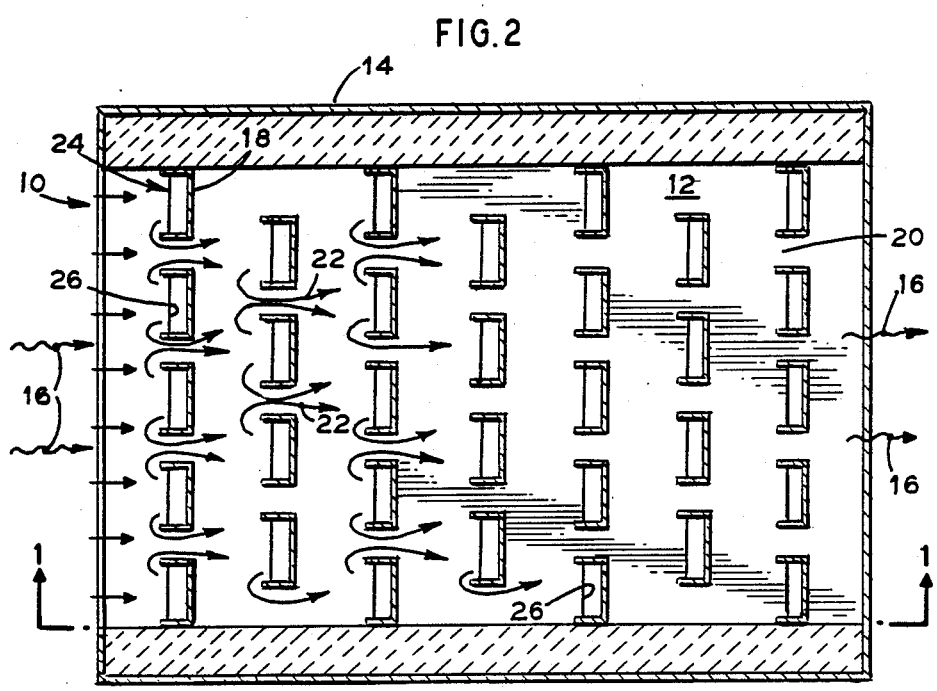
FIG. 2 is a planar pictorial view of the collector and the hopper illustrating the staggered positioning of the impingement members.
Figure 4:
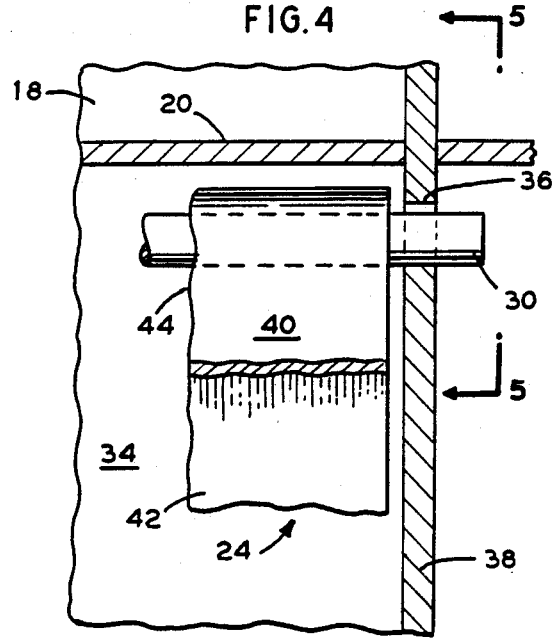
FIG. 4 is a sectional view, partially cut away, taken along Lines 4—4 of FIG. 3.
Figure 5:
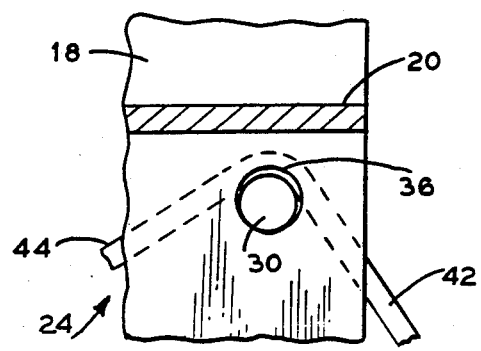
FIG. 5 is a sectional view, partially cut away, of the rod opening, taken along Lines 5—5 of FIG. 4.
Figure 7:
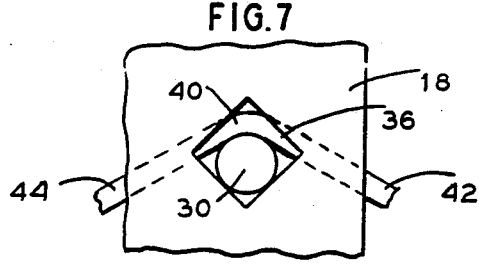
FIG. 7 is a cutaway view of an alternate embodiment of the rod opening as first shown in FIG. 5.

Referring initially to FIGS. 1 and 2, there is shown a portion of boiler 10, and more specifically impingement type collector 12 and storage hopper 14. As illustrated, flue gas 16 enters collector 12 and strikes the first row of impingement members 18. This flow then flows around these obstacles and between adjoining members 18 to thereafter impinge upon the second row of impingement members 18. As flue gas 16 flows around each row of obstacles, the solid particles entrained in the gas strike the members 18 and fall downward toward storage hopper 14. Upon reaching bottom pan 20, the solid particles fall through opening in the pan and eventually collect in hopper 14 for later processing. Pan 20 is the lower boundary of the flue gas conduit of boiler 10 in which collector 12 is installed. Pan 20 also separates this flue gas conduit from hopper 14.

The embodiment shown in these Figs. illustrates U-beams as impingement members 18. Of course, a variety of other shapes are equally suitable, such as C, V, or I shapes (channels, angle iron, or I-beams), for use as impingement members 18. The U-beams or members 18 shown are generally supported vertically from the top of boiler 10, such as by being suspended, and they extend downward through pan 20 into the upper region of hopper 14. In doing so, members 18 form the side and downstream boundaries of openings 26 which are in pan 20. Consequently, members 18 are oriented so that their open side faces the incoming flue gas 16.

As indicated in FIG. 2, each row of members 18 are closely spaced so as to essentially obstruct 50 or more percent of the conduit flow area. The outermost flange of alternate rows of members 18 abut either refractory 19 protecting outside wall 21 or outside wall 21 itself. This prevents any gap from occurring that would enable flue gas 16 to by-pass consecutive rows of members 18 along the outside wall. Also, each row of members 18 is offset or staggered with respect to adjacent rows such that the middle of one member is aligned with the space between adjacent members in the row just ahead or just behind it. In this fashion, the flow through impingement collector 12 occurs very much as shown by arrows 22 with each impingement member 18 in each row acting as a deflector to remove the solid particles from flue gas 16.

Referring now more specifically to FIGS. 3 through 7, there is shown restrictor assembly 24 which is secured to a bottom end region of each impingement member 18. Assembly 24 is secured just underneath pan 20 and in close proximity to opening 26 in pan 20 through which the solid particles fall. The open area of opening 26 generally extends only within the confines of each impingement member 18 and this open area is generally smaller than the entire enclosed area of the member. As shown, the majority of restrictor assembly 24 is positioned within the confines or enclosed area of member 18 with there being little clearance between the sides of this assembly and flanges 38 of member 18 (on the order of 1/32 to 1/16 of an inch or so). However, there is sufficient clearance to prevent restrictor assembly 24 from sticking or becoming stuck.

Restrictor assembly 24 pivots about rod 30 which extends perpendicular to the elongated length of member 18. This rod 30 is positioned closer to outer edge 32 than to web 34 of the illustrated U-beam impingement member 18 and there are concentric, oppositely spaced rod openings 36 in each side flange 38 of the U-beam. These openings 36 are oversized so as to enable rod 30 to pivot freely along its axis and openings 36 may be circular (FIG. 5), square (FIG. 7) or any other shape so long as rod 30 can freely rotate with no jamming or friction. Welded or otherwise secured along most of the length of rod 30 is baffle plate 40 which is bent around rod 30 at an angle of approximately 90°. Baffle plate 40 consists of a baffle end region 42 and a counterweighted end region 44. Baffle end region 42 is generally planar and is sized to pivot within the enclosed area of member 18 so as to block opening 26. The purpose of baffle end region 42 is to reduce the effective open area of opening 26 thereby also reducing the flow of flue gas through this opening. However, restrictor assembly 24 is designed so that any solids coming from solids collector 12 will strike baffle end region 42 and pivot it about rod 30 thereby gaining access to hopper 14. Baffle end region 42 is capable of completely blocking opening 26 if need be by extending all the way from rod 30 to web 34 of the U-beam member 18. Generally, however, baffle end region 42 is stopped before actually engaging web 34 thereby creating a relatively small gap between the two.

It should here be noted that rod 30 is positioned approximately ¼ inch and by all means less than two inches or so underneath pan 20. This is to prevent any solid particles from working their way between pan 20 and rod 30 in an upstream direction. If such flow were permitted, these particles would accumulate in this space thereby hindering the full rotation of counterweighted end region 44. Rod 30 is also secured adjacent the leading edge of opening 26 such that the entire area of opening 26 can be effectively blocked if so desired. Normally, however, baffle end region 42 does not quite close off opening 26 because end 46 is stopped just short of physically engaging web 34 of U-beam member 18. This gap between end 46 of baffle end region 42 and member 18 is at a minimum (about 1¼ inch although other distances can be accommodated) when plate 40 is in its normally closed position. By thus restricting opening 26, a very small area is presented for flue gas 16 to flow through. Baffle plate 40 also forms an angle of about 35° from the vertical when in this closed position. In contrast, the fully open position would have baffle end region 42 nearly parallel with but spaced from web 34 of U-beam member 18, the space between them being the same (or approximately the same) as opening 26 in pan 20.

Counterweighted end region 44 of baffle plate 40 is, obviously, on the opposite side of rod 30 as is baffle end region 42. Counterweighted end region 44 consists of a counterweight 48 with a stop bar 50 secured to it. Counterweight 48 is designed to overcome the bending moment forces of baffle end region 42 around rod 30 such that baffle end region 42 is constantly biased in the normally closed position shown in dotted lines in FIG. 3. Both the weight of counterweight 48 and its distance from rod 30 along counterweighted end region 42 are factors that help determine the magnitude of the closing bias of baffle plate 40. Generally this bias is not too significant otherwise the weight of any solid particles falling through opening 26 would not be sufficient enough to pivot normally closed baffle plate 40 to the open position. However, this closing bias is sufficient enough to restrict any downwardly flowing flue gas 16 from pivoting this plate open.

Counterweight 48 would preferably have a rectangular or otherwise elongated configuration so that stop bar 50 could be attached near its end region. It is this stop bar which, by contacting edge 32 of at least one of flanges 38, stops the rotation of baffle plate 40 such that the gap previously discussed is created. By adjusting the position of stop bar 50 along elongated counterweight 48, a greater or lesser gap can be created if desired.

The operation of this discharge restrictor is as follows. Flue gas 16 from boiler 10 flows through collector 12. As this flue gas flows around the various impingement members 18 in collector 12, the solid particles entrained in flue gas 16 strike the open surface of these members 18. These particles then fall downward along this vertically oriented member 18 and through openings 26 in pan 20 where they strike baffle end region 42 of baffle plate 40. In some cases these particles will slide or roll along the downward slope of baffle end region 42 and fall through the gap before falling into hopper 14. In other cases, the particles will strike baffle end region 42 in such large numbers that their combined weight will overcome the closing bias and pivot plate 40 around rod 30 thereby discharging these particles into hopper 14. After such discharge, counterweight 48 recycles or biases baffle plate 40 back to its originally closed position. In still other cases large chunks or sheets of solid particles will fall from collector 12 and through opening 26 where their weight and momentum will temporarily pivot baffle end region 42 to the open position.

As stated earlier, counterweight 48 and stop bar 50 are sized and positioned so as to bias baffle plate 40 in the closed position, yet be capable of pivoting around rod 30 under the weight of accumulated solid particles. In its normally closed position, baffle end region 42 acts as a baffle to prevent any flue gas 16 from flowing either upward or downward through opening 26. For downwardly flowing flue gas, the combination of counterweight 48 and stop bar 50 is such that baffle plate 40 does not rotate or rotates very little under such loading. For upwardly flowing flue gas, the 35 degree from vertical angle and the position of baffle plate 40 are such that the upward flow actually acts to retain this plate in its closed position. Thus, regardless of the direction of flow, baffle plate 40 acts to restrict such flow through opening 26 while still enabling the solid particles from collector 12 to pass into hopper 14.

As stated earlier end 46 of baffle end region 42 stops short of actually contacting web 34 of impingement member 18. The gap that is created by stopping short presents a relatively small opening to any upwardly flowing flue gas 16 thereby restricting the volume of such flow. Such restriction occurs even though there generally is a pressure difference across opening 26 between hopper 14 and collector 12.

Also, when the solids flow rate through opening 26 is low, baffle end region 42 remains closed thereby presenting a minimum open area for any bypassing flue gas. However, when the solids flow rate increases or when chunks or sheets of material try to fall through opening 26, the weight of such solids will cause baffle end region 42 to rotate briefly against the force of counterweight 48. Thus the required function of restricting opening 26 to reduce the flue gas bypassing and the ability of restrictor assembly 24 to pass large quantities of solid particles or to pass chunks or sheets is accomplished.

Although the above description is made with respect to U-beam impingement members suspended in an in-line impingement type collector, it should be noted that this description is also applicable to restrictor assemblies secured to other types of collectors and/or impingement members. Likewise, although the above described restrictor assembly pertains to a generally rectangular baffle plate, any other configuration is equally suitable. Finally, it should be noted that other modifications can be made to this restrictor assembly which would still come within the scope of this invention.

What is claimed as invention is:

1. A discharge restrictor for a flow-through impingement type solids collector comprising:
   (a) a rod pivotally secured to the lower end region of a generally vertically supported impingement member, said rod extending between spaced supports forming a part of said impingement member;
   (b) a pivotable baffle plate secured to said rod and sized to effectively block a preselected area immediately adjacent said impingement member;
   (c) pivoting means for alternately pivoting said baffle plate between select closed and open positions thereby alternately blocking and unblocking said preselected area;
   (d) stopping means secured to said baffle plate for selectively stopping the rotation of said baffle plate; and
   (e) bias means secured to said baffle plate for normally biasing said baffle plate in the said closed position whereby said preselected area immediately adjacent said impingement member is essentially blocked by said baffle plate.

2. A discharge restrictor as set forth in claim 1 wherein said impingement member is configured having a generally enclosed area across which said rod extends.

3. A discharge restrictor as set forth in claim 2 wherein said impingement member is a U-beam.

4. A discharge restrictor as set forth in claim 2 wherein said baffle plate comprises a first region configured to closely fit within the said enclosed area of said impingement member.

5. A discharge restrictor as set forth in claim 4 wherein said bias means comprise at least one counterweight sized to normally bias said baffle plate in the said closed positions.

6. A discharge restrictor as set forth in claim 5 wherein said rod extends through concentric openings in said impingement member.

7. A discharge restrictor as set forth in claim 6 wherein said stopping means comprise a stop configured to engage said impingement member.

8. A discharge restrictor for a flow-through impingement type solids collector comprising:
   a. a rod pivotally secured to the lower end region of a generally vertically supported impingement member, said rod extending between spaced flanges of said member;
   b. a baffle plate rigidily secured to and bent around said rod, said baffle plate rotatable between select open and closed positions;
   c. a first portion of said baffle plate being sized to closely fit between said flanges and within the enclosed area of said member;
   d. a second portion of said baffle plate configured to extend beyond said flanges and outside the enclosed area of said member;
   e. a stop secured to said second portion of said baffle plate and configured to stop the rotation of said baffle plate and said rod;
   f. bias means for normally biasing said baffle plates in the said closed position wherein said first portion of said baffle plate essentially blocks all but a slight portion of the enclosed area of said member; and,
   g. pivoting means for alternately pivoting said baffle plate between said closed position and said open position thereby alternately blocking and unblocking the said enclosed area of said member.

9. A discharge restrictor as set forth in claim 8 wherein said discharge restrictor is secured to said impingement member directly underneath the lower boundary of a flue gas conduit.

10. A discharge restrictor as set forth in claim 9 wherein said rod extends through concentrically aligned openings in said flanges, said openings being sized larger than the ends of said rod so as to enable said rod to freely rotate within said openings.

11. A discharge restrictor as set forth in claim 10 wherein said openings are positioned closer to the outer edge of each said flange than to the web of said impingement member whereby said rod is off-centered with respect to the said enclosed area of said impingement member.

12. A discharge restrictor as set forth in claim 11 wherein the spacing between said first portion of said baffle plate and each said flange is approximately 1/32 to 1/16 of an inch.

13. A discharge restrictor as set forth in claim 11 wherein said stop secured to said second portion of said baffle plate comprises a stop bar that engages an edge portion of at least one said flange.

14. A discharge restrictor as set forth in claim 13 wherein said bias means comprise a counterbalance weight secured to said second portion of said baffle plate, said counterbalance weight biasing said baffle plate in the said closed position.

15. A discharge restrictor as set forth in claim 14 wherein said baffle plate is spaced approximately 1¼ inches from said web of said impingement member when said baffle plate is fully biased in the said closed position thereby blocking a substantial portion of the said enclosed area of said impingement member.

16. A discharge restrictor as set forth in claim 15 wherein said rod is secured to said impingement member at an elevation just below the said lower boundary of said flue gas conduit in which said restrictor is positioned.

17. A discharge restrictor as set forth in claim 16 wherein said rod is secured less than two inches below said lower boundary of said flue gas conduit.

* * * * *